(12) United States Patent
Dugan et al.

(10) Patent No.: US 7,543,081 B2
(45) Date of Patent: Jun. 2, 2009

(54) USE OF N_PORT ID VIRTUALIZATION TO EXTEND THE VIRTUALIZATION CAPABILITIES OF THE FC-SB-3 PROTOCOL AND OTHER PROTOCOLS

(75) Inventors: Robert J. Dugan, Hyde Park, NY (US); Giles Roger Frazier, Austin, TX (US); Allan Samuel Meritt, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 179 days.

(21) Appl. No.: 11/463,154

(22) Filed: Aug. 8, 2006

(65) Prior Publication Data
US 2008/0127326 A1 May 29, 2008

(51) Int. Cl.
*G06F 3/00* (2006.01)
(52) U.S. Cl. .......................................... 710/3
(58) Field of Classification Search ................ 710/3
See application file for complete search history.

(56) References Cited

U.S. PATENT DOCUMENTS

| 6,807,579 | B1* | 10/2004 | Frazier ....................... 709/245 |
| 6,941,260 | B2 | 9/2005 | Emberty et al. |
| 6,988,130 | B2 | 1/2006 | Blumenau et al. |
| 2002/0194294 | A1* | 12/2002 | Blumenau et al. ........... 709/213 |
| 2003/0061379 | A1* | 3/2003 | Craddock et al. ........... 709/238 |
| 2004/0151188 | A1 | 8/2004 | Maveli et al. |
| 2005/0198523 | A1 | 9/2005 | Shanbhag et al. |
| 2007/0174851 | A1* | 7/2007 | Smart ......................... 719/324 |

OTHER PUBLICATIONS

U.S. Appl. No. 11/318,971, filed Dec. 27, 2005, Holland.

* cited by examiner

*Primary Examiner*—Henry W. H. Tsai
*Assistant Examiner*—Hyun Nam
(74) *Attorney, Agent, or Firm*—Yee & Associates, P.C.; Libby Z. Handelsman

(57) ABSTRACT

A computer implemented method, data processing system, and computer usable program code are provided for using identifier virtualization to extend the virtualization capabilities of protocols. A determination is made as to whether a logical entity requires a unique identifier in order to extend a virtualization capability of a protocol. A unique name is assigned that is associated with the logical entity. The unique identifier is requested from a fabric using the unique name. The logical entity is notified that the unique identifier has been established for the logical entity in response to receiving the unique identifier from the fabric. The unique identifier identifies the logical entity within or attached to the fabric.

1 Claim, 6 Drawing Sheets

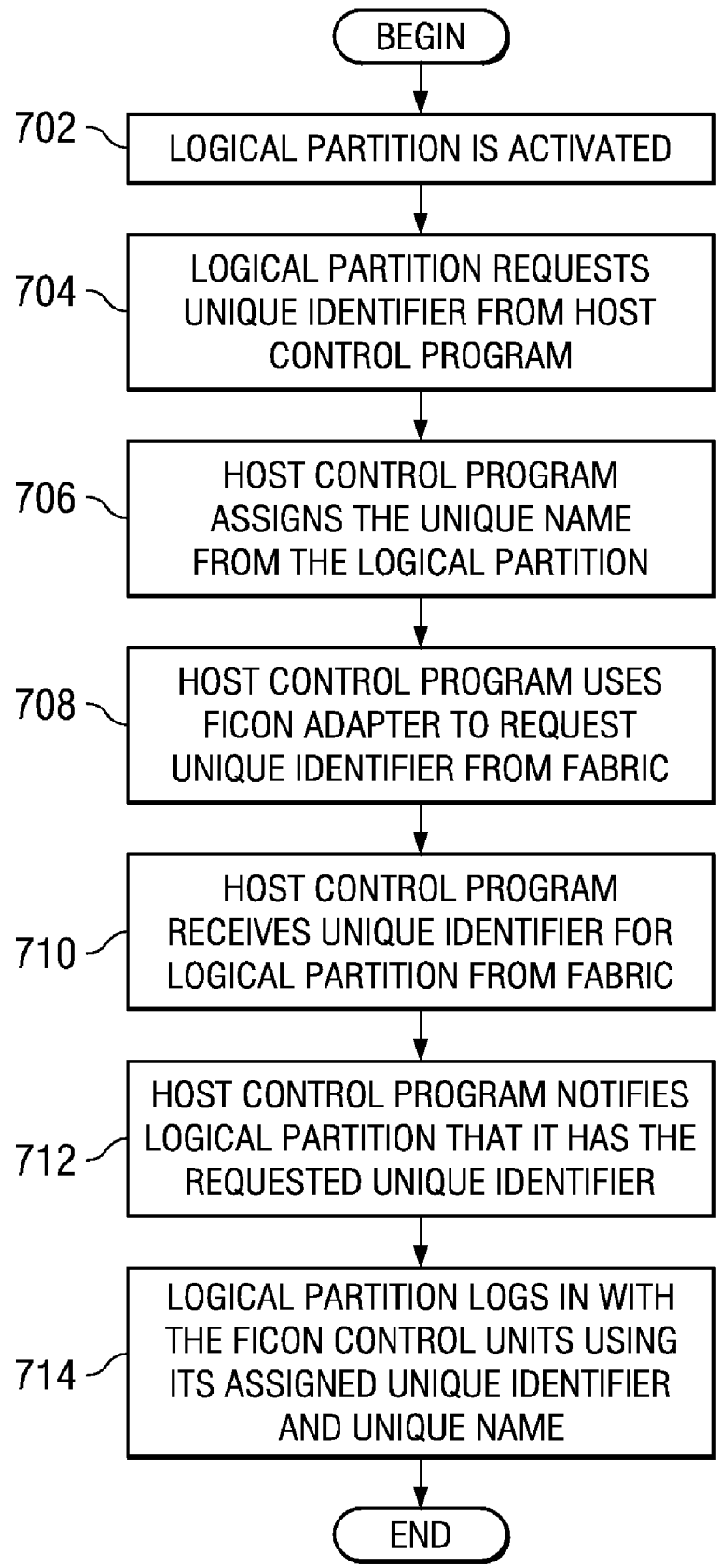

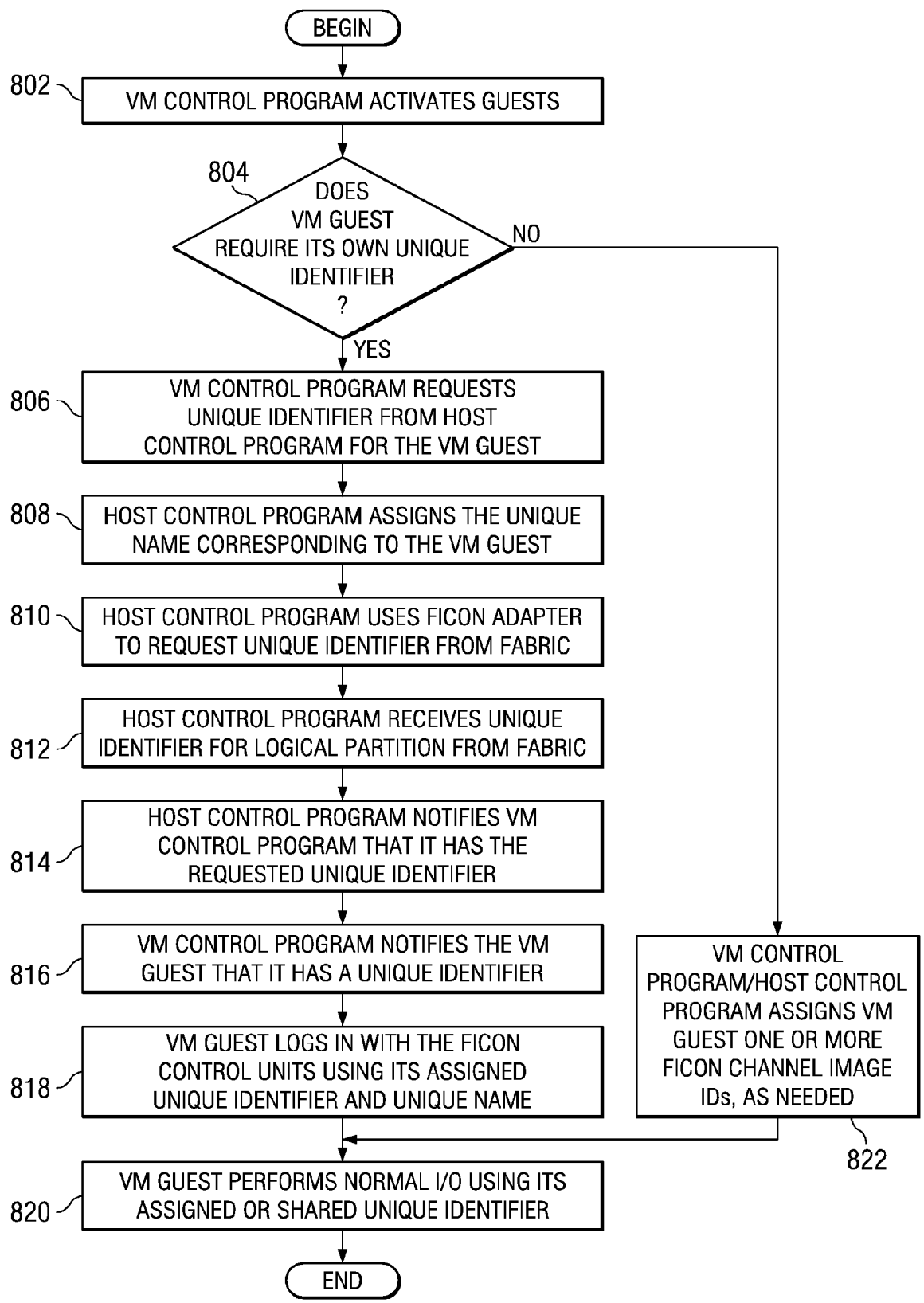

USE OF N_PORT ID VIRTUALIZATION TO EXTEND THE VIRTUALIZATION CAPABILITIES OF THE FC-SB-3 PROTOCOL AND OTHER PROTOCOLS

BACKGROUND OF THE INVENTION

1. Field of the Invention

The present application relates generally to virtualization of ports. More particularly, the present application relates to a computer implemented method, data processing system, and computer usable program code for using N_Port ID virtualization to extend the virtualization capabilities of the FC-SB-3 protocol as well as other protocols.

2. Description of the Related Art

N_Port ID virtualization (NPIV) allows a single fibre channel node port (N_Port) to register multiple worldwide port names (WWPN) with a fabric name server. A worldwide port name is a unique name in a fibre channel storage area network. Each registered worldwide port name is assigned a unique identifier, such as a N_Port ID, when it connects to a fabric. With N_Port ID virtualization, a single fibre channel node port may appear as multiple worldwide port names in the fibre channel fabric. Usage of N_Port ID virtualization in today's environment is usually limited to protocols that do not provide the capability to address individual logical images within a host system. One such protocol is the fibre channel protocol for small computer system interface (FCP-SCSI). Without N_Port ID virtualization, the FCP-SCSI is incapable of identifying the sender of a command as one of a plurality of host system logical images unless each logical image uses a dedicated fibre channel protocol host adapter. Since the sender of a SCSI command always needs to be identified regardless of whether it is a logical image or a physical system, the inability of the FCP-SCSI to identify host logical images requires the use of a dedicated fibre channel protocol host adapter for each host logical image. After N_Port ID virtualization was developed, there was no longer a need to assign a dedicated fibre channel protocol host adapter to each host logical image, since N_Port ID virtualization provides the addressing capability that identifies the sender of a command as one of a plurality of host logical images.

A similar situation exists in protocols such as the fibre channel—single-byte command code sets mapping-3 (FC-SB-3) protocol, also known as FICON protocol, even where such protocols have the ability to identify individual host logical images. For example, if a host system contains multiple independent partitions and each partition requires the use of the host logical image addressing capability provided by the FICON protocol, then there is a need to use N_Port ID virtualization to extend the addressing capability of each logical partition. An example of such a system is one in which part of the system processing capability is rented to individual customers, each of which requires that its partition have all of the characteristics that it would have if it were using dedicated hardware. In these systems, a dedicated FICON adapter has been required in order to support each such partition because that was the only way to make all of the FICON logical paths available to the customer. This has resulted in excessive system cost when several such partitions exist.

Also, protocols such as FICON addressed the end-to-end connectivity within their unique upper level protocols. As a result, functions only dealt with at the lower levels, such as zoning and other management functions, can only deal with FICON protocol at the physical level. This causes the scope of all of these functions to be for all partitions sharing the adapter, rather than being able to deal with the individual partition. This is a problem even in environments which only involve a single enterprise.

SUMMARY OF THE INVENTION

The different aspects of the illustrative embodiments provide a computer implemented method, data processing system, and computer usable program code for using identifier virtualization to extend the virtualization capabilities of protocols. The illustrative embodiments determine if a logical entity requires a unique identifier in order to extend a virtualization capability of a protocol. The illustrative embodiments assign a unique name associated with the logical entity. The illustrative embodiments request the unique identifier from a fabric using the unique name. Responsive to receiving the unique identifier from the fabric, the illustrative embodiments notify the logical entity that the unique identifier has been established for the logical entity. The unique identifier identifies the logical entity within or attached to the fabric.

BRIEF DESCRIPTION OF THE DRAWINGS

The novel features believed characteristic of the illustrative embodiments are set forth in the appended claims. The aspects of the illustrative embodiments, however, as well as a preferred mode of use, further objectives and advantages thereof, will best be understood by reference to the following detailed description of an illustrative embodiment when read in conjunction with the accompanying drawings, wherein:

FIG. 7 is a flow diagram for a system with logical partitions in accordance with an illustrative embodiment; and FIG. 8 is a flow diagram for a system with second-level virtual machine guests in accordance with an illustrative embodiment.

DETAILED DESCRIPTION OF THE PREFERRED EMBODIMENT

Figure 1:
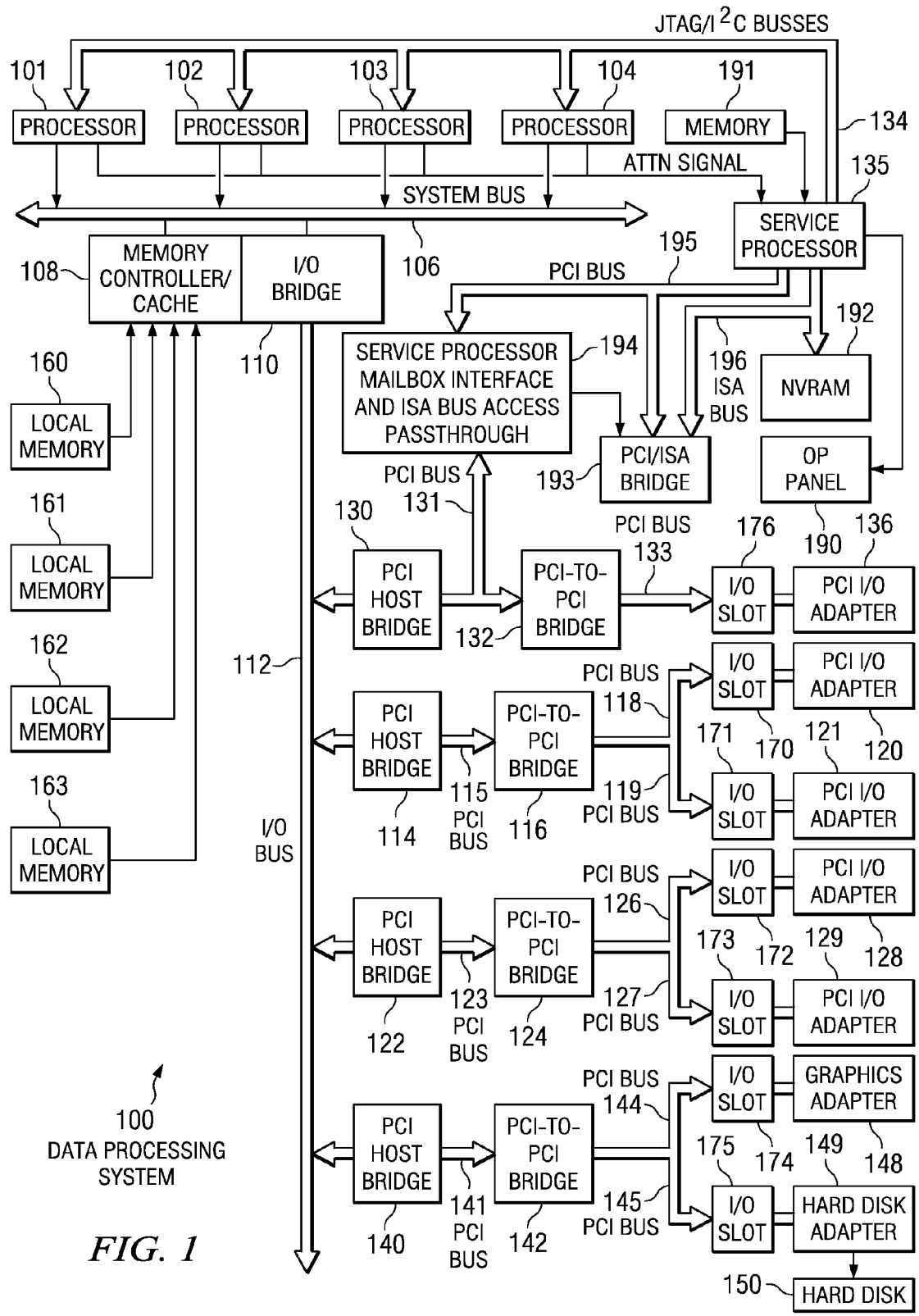
FIG. 1 is a block diagram of a data processing system in which the illustrative embodiments may be implemented.

The present application provides a computer implemented method, system, and computer usable program code for using N_Port ID virtualization (NPIV) to extend the virtualization capabilities of the FC-SB-3 protocol (FICON) as well as other protocols. With reference now to the figures, and in particular with reference to FIG. 1, a block diagram of a data processing system in which illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems, or multiple instances of a single operating system, or a combination of both, running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a logical partition and each logical partition may operate multiple operating systems or virtual machines (VMs). Thus, each operating system executing within data processing system 100 may access only the local memory and I/O adapters that are within its logical partition. Thus, for example, one instance of the z/OS operating system may be executing within partition P1, a second instance (image) of the z/OS operating system may be executing within partition P2, and a third instance of the z/OS operating system may be operating within logical partition P3.

I/O bus 112 may provide access to a plurality of bus protocols. The illustrative embodiments use an exemplary PCI protocol. Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM System z system available from International Business Machines Corporation. Such a system supports logical partitioning, and a z/OS operating system, which is also available from International Business Machines Corporation, can execute in each partition.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
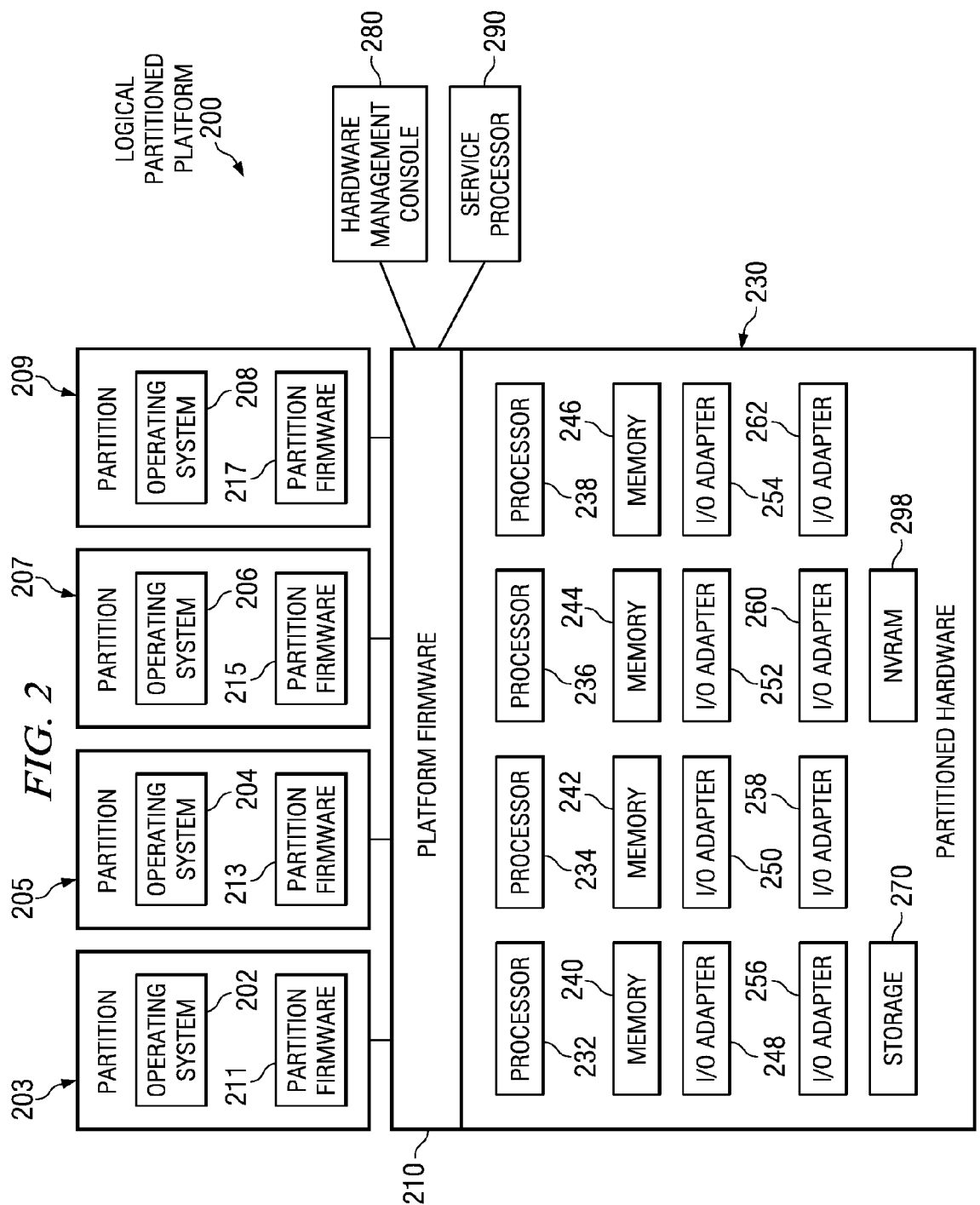
FIG. 2 is a block diagram of an exemplary logical partitioned platform in which the illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and platform firmware 210. Operating systems 202, 204, 206, and 208 may be multiple copies of a single operating system or multiple heterogeneous operating systems simultaneously run on logical partitioned platform 200. These operating systems may be implemented using z/OS, which are designed to interface with a partition management firmware, such as Hypervisor. z/OS is used only as an example in these illustrative embodiments. Operating systems 202, 204, 206, and 208 are located in partitions 203, 205, 207, and 209. Hypervisor software is an example of software that may be used to implement platform firmware 210 and is available from International Business Machines Corporation. Firmware may be "software" that is stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Firmware may also be stored on disks and then loaded into random access memory (RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 may include a plurality of processors 232-238, a plurality of system memory units 240-246, a plurality of input/output (I/O) adapters 248-262, an NVRAM storage unit 298, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Platform firmware 210 performs a number of functions and services for partitions 203, 205, 207, and 209 to create and enforce the partitioning of logical partitioned platform 200. Platform firmware 210 is a firmware implemented virtual machine identical to the underlying hardware. Thus, platform firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console 280. Hardware management console 280 is a separate data processing system from which a system administrator may perform various functions including reallocation of resources to different partitions.

The illustrative embodiments provide a single FICON host adapter that supports N_Port ID virtualization (NPIV), instead of one FICON adapter per partition. N_Port ID virtualization allows a single fibre channel node port (N_Port) to register multiple worldwide port names (WWPN) with a fabric name server. A WWPN is a unique name in a fibre channel storage area network. Each registered WWPN is assigned a unique identifier, such as a N_Port ID. With N_Port ID virtualization, a single fibre channel N_Port on a FICON host adapter may appear as multiple N_Ports in the fibre channel fabric, each with a unique WWPN and N_Port ID. One or more of the acquired N_Port IDs are assigned to each partition. This provides each partition with the same addressing capability that it would have had if it had been assigned a dedicated FICON adapter. That is, each of the partitions has all of the FICON logical paths available for its own use just as if it were using a dedicated FICON adapter. If N_Port ID virtualization were not used, each of the partitions would only have a subset of the FICON logical paths for its use because the other logical paths would need to be assigned to the other partitions.

The illustrative embodiments also provide a management solution using the single FICON host adapter that supports N_Port ID virtualization. Since each partition would have a unique N_Port ID and WWPN, it would be uniquely identifiable in the same manner as if it had a separate FICON adapter. As a result, management functions would be able to identify and manage down to the individual partition level; for example, functions such as zoning, which use WWPN, would now work at a partition granularity, and the WWPN of each partition would be listed in the fabric name server database. Additionally, fabric security services would be available to each partition as if it were using a dedicated FICON host bus adapter (HBA).

In addition to solving the above problems, the illustrative embodiments enable the FICON control units to provide a function analogous to small computer system interface (SCSI) logical unit number (LUN) masking. In SCSI LUN masking, access to logical units (LUs) belonging to a control unit, such as a SCSI target controller, can be restricted to a set of host images by associating each LU with an "access control list." The access control list is a list of WWPNs allowed to access the LU. Since N_Port ID virtualization allows the host partitions using a single FICON adapter to have multiple unique WWPNs and be assigned unique N_Port IDs, then the same type of access lists can be kept for the FICON control unit images as were kept for SCSI LUs in the SCSI protocol. This similarity of function simplifies the design of dual protocol control units that must limit accessibility of devices in both the FICON and SCSI protocols because it allows the same problem to be solved in exactly the same way. It also simplifies the design of system management programs which manage the creation of these access lists.

Another potential application of the illustrative embodiments is in a partition running multiple virtual machine (VM) guests that use FICON I/O devices. In the absence of N_Port ID virtualization, such a partition is assigned a single N_Port ID, since the adapter can be assigned only one, and it is only assigned a single FICON channel image ID, since other channel image IDs are needed for other partitions. The FICON channel image ID must be shared among all the virtual machine guests running in the partition. Since channel programs generated by all the virtual machine guests in a partition use the same N_Port ID and channel image ID, FICON control units cannot distinguish among the virtual machine guests. Therefore, if a particular virtual machine guest reserves a FICON volume, for example, the virtual machine control program must make sure that no other of the virtual machine guests access that volume since the FICON control unit is unable to control the access since it cannot distinguish among the guests. Using a virtual machine control program results in significant performance degradation. Use of N_Port ID virtualization allows the virtual machine control program to assign a unique WWPN to each of its virtual machine guests, which then obtains a unique N_Port ID, thereby enabling each virtual machine guest to be distinguishable by FICON control units. This enables the FICON control units to enforce reserve commands at the virtual machine guest level, thereby removing the need for the virtual machine control program to enforce reserves and significantly improve performance.

An alternate to the above illustrative embodiment would be to assign the virtual machine partition one or more N_Port IDs, but allow the virtual machine control program to use multiple FICON channel image IDs, instead of a single channel image ID. The virtual machine control program can then assign a separate channel image ID to each guest, which still permits CUs to distinguish among the guests, even though the guests use the same N_Port ID value.

In this situation, other N_Port IDs could be assigned to other partitions sharing the host adapter that may also be running virtual machines.

Figure 3:
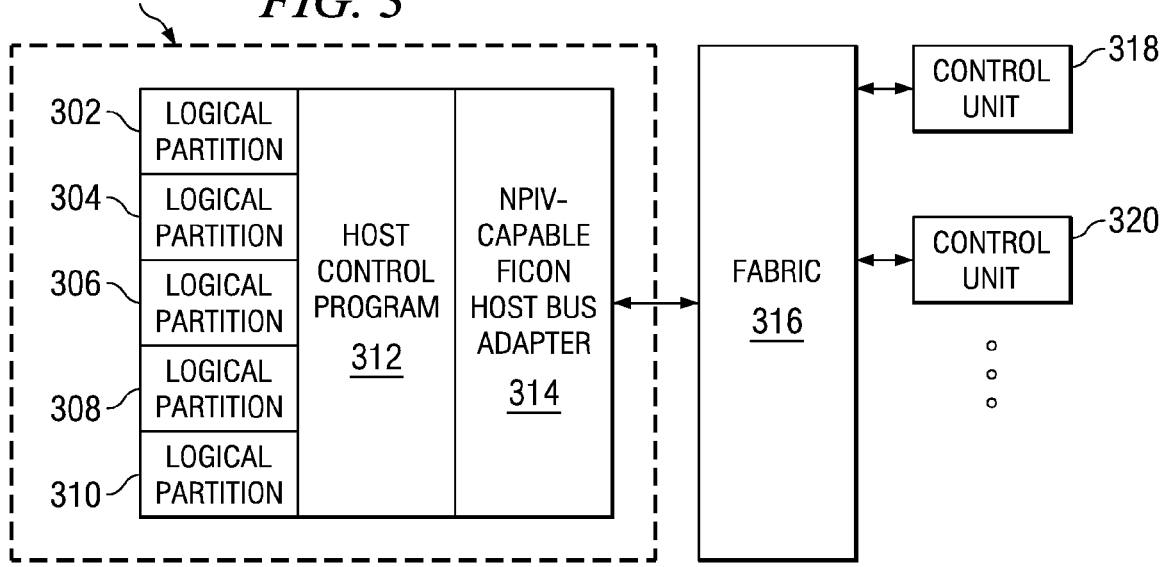
FIG. 3 depicts a functional block diagram of a logically partitioned system in accordance with an illustrative embodiment.

FIG. 3 depicts a functional block diagram of a logically partitioned system in accordance with an illustrative embodiment. Exemplary host system 300 is comprised of five independent logical partitions 302, 304, 306, 308, and 310, host control program 312, and N_Port ID virtualization-capable FICON host bus adapter 314. Logical partitions 302, 304, 306, 308, and 310 may be logical partitions such as partitions 203, 205, 207, or 209 of FIG. 2. Host bus adapter 314 is connected to fabric 316. Fabric 316 provides access to multiple control units, such as control units 318 and 320. Each of logical partitions 302, 304, 306, 308, and 310 require the use of all FICON logical paths, and each of logical partitions 302, 304, 306, 308, and 310 may also require access to control unit 318 or 320 that may be in different zones within fabric 316.

In accordance with the illustrative embodiments, host control program 312, which may be a host control program such as a hypervisor, performs the following operations:

For each of logical partitions 302, 304, 306, 308, and 310, host control program 312 acquires a unique N_Port ID for each FICON channel image using a unique WWPN already assigned to each logical partition and notifies each of logical partitions 302, 304, 306, 308, and 310 when complete.

When sending FICON Information Units (IUs) and other fibre channel (FC) frames, each of logical partitions 302, 304, 306, 308, and 310 use the N_Port ID obtained by host control program 312 as a source ID (S_ID). When sending N_Port login frames to control units 318 or 320 and other N_Port IDs, each of logical partitions 302, 304, 306, 308, and 310 insert the WWPN corresponding to its assigned N_Port ID in the login payload.

Figure 4:
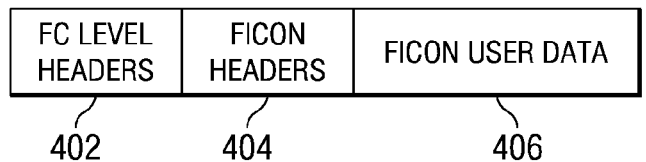
FIG. 4 illustrates the relevant portions of an exemplary FICON information unit (IU), which is a sequence of frames containing addressing information and user data in accordance with an illustrative embodiment.

FIG. 4 illustrates the relevant portions of an exemplary FICON Information Unit (IU), which is a sequence of frames containing addressing information and user data in accordance with an illustrative embodiment. In information unit 400, FC level headers 402 includes the N_Port ID obtained by the host control program, such as host control program 312 of FIG. 3, for the host partition in a source ID (S_ID) field. FICON headers 404 include the FICON channel image ID in a "Channel Image" field. FICON user data 406 contain data to be sent to the control unit such as control unit 320 of FIG. 3. While the above embodiment describes the application of N_Port ID virtualization to the FICON protocol, an analogous embodiment would apply to the other protocols such as Internet protocol (IP) over Fibre channel and protocols now being developed that use fibre channel protocol to transport upper level protocol commands.

Figure 5:
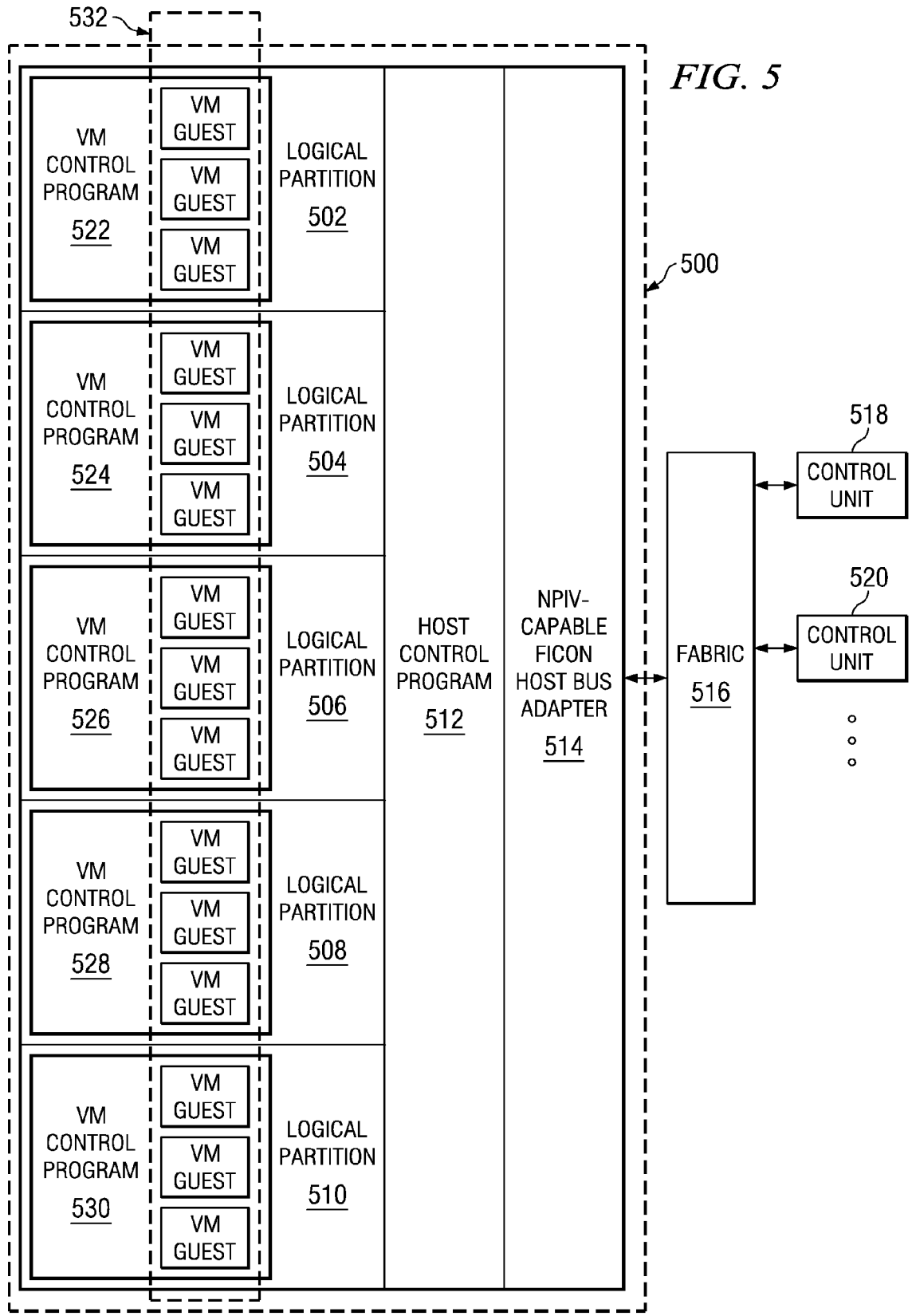
FIG. 5 depicts a functional block diagram of a logically partitioned system supporting multiple virtual machine guests in accordance with an illustrative embodiment.

FIG. 5 depicts a functional block diagram of a logically partitioned system supporting multiple virtual machine guests in accordance with an illustrative embodiment. Exemplary host system 500 is comprised of five independent logical partitions 502, 504, 506, 508, and 510, host control program 512, and N_Port ID virtualization-capable FICON Host Bus Adapter 514. Logical partitions 502, 504, 506, 508, and 510 may be logical partitions such as partitions 203, 205, 207, or 209 of FIG. 2. Host Bus Adapter 514 is connected to fabric 516. Fabric 516 provides access to multiple control units, such as control units 518 and 520. Each of logical partitions 502, 504, 506, 508, and 510 contain a respective one of virtual machine (VM) control program 522, 524, 526, 528, and 530. Each one of virtual machine control program 522, 524, 526, 528, and 530 supports multiple virtual machine guests 532.

In this illustrative embodiment, host control program 512 and virtual machine control programs 522, 524, 526, 528, and 530 perform the following operations:

Virtual machine control program 522, 524, 526, 528, or 530 in each partition determines the number of N_Port IDs it needs in order to support its virtual machine guests 532.

Each virtual machine control program 522, 524, 526, 528, or 530 sends requests to host control program 512 for the required number of N_Port IDs.

In response to each request, host control program 512 acquires a unique N_Port ID using a unique WWPN and notifies virtual machine control program 522, 524, 526, 528, or 530 when complete.

Virtual machine control program 522, 524, 526, 528, or 530 assigns a unique N_Port ID to those virtual machine guests that require them and assigns a unique channel image ID to those virtual machine guests 532 that do not require a unique N_Port ID. Virtual machine guests 532 that do not require a unique N_Port ID share a common N_Port ID.

When sending FICON IUs and other FC frames, each one of virtual machine guests 532 that was assigned a unique N_Port ID uses it as a source identifier (S_ID) in all FICON IUs it sends; other virtual machine guests use the shared N_Port ID. When sending N_Port Login frames to control units 518 or 520 and other N_Port IDs, all virtual machine guests 532 put the WWPN corresponding to their assigned N_Port ID (either shared or dedicated) in the Login payload.

Alternative methods exist for how virtual machine control programs 522, 524, 526, 528, and 530 would associate WWPNs and corresponding N_Port IDs with virtual machine guests 532. For example, virtual machine control programs 522, 524, 526, 528, and 530 could generate WWPNs as part of the definition of a particular one of virtual machine guests 532. When that one of virtual machine guests 532 is activated, the associated WWPNs are used and N_Port IDs are obtained.

Figure 6:
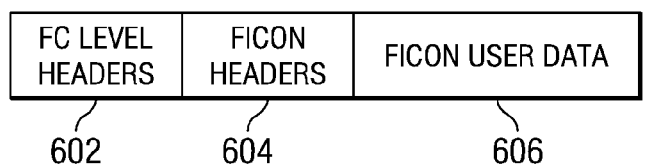
FIG. 6 illustrates an exemplary FICON information unit (IU) in accordance with an illustrative embodiment.

FIG. 6 illustrates an exemplary FICON IU in accordance with an illustrative embodiment. In information unit 600, if the virtual machine guest, such as one of virtual machine guests 532 of FIG. 5, was assigned a unique N_Port ID, FC level headers 602 include that N_Port ID; otherwise, FC level headers 602 contain the N_Port ID that is shared among those virtual machine guests that do not require a unique N_Port ID. If the shared N_Port ID is used in FC level headers 602, the "Channel Image" field in FICON headers 604 identifies the particular virtual machine guest sending the information unit. FICON user data fields 606 contain data to be sent to the control unit, such as control unit 520 of FIG. 5.

FIG. 7 is a flow diagram for a system with logical partitions in accordance with an illustrative embodiment. The steps of the following operation are performed in a host control program, such as host control program 312 of FIG. 3. As the operation begins, the logical partition, which is a logical entity, is recognized as being activated by the host control program (step 702). The logical partition or logical entity may be any logical partition, such as logical partition 302, 304, 306, 308, or 310 of FIG. 3. The host control program receives a request for unique identifier, such as a N_Port ID, from the logical partition (step 704). The host control program then assigns the unique name, such as a WWPN, corresponding to the requesting logical partition (step 706). This step can be done using a storage area network (SAN) management function, manually, or otherwise. The host control program uses the FICON adapter to request a unique identifier from the fabric using the unique name (step 708).

The host control program receives the unique identifier for the logical partition from the fabric (step 710). The host control program notifies the logical partition that the host control program has the requested unique identifier (step 712). Finally, the host control program recognizes the logical partition logging in with FICON control units using its assigned unique identifier and unique name (step 714), with the operation terminating thereafter. The logical partition is able to use all FICON channel image IDs. Note that the logical partition does not need to know its unique name and unique identifier if the host control program sends IUs on the logical partition's behalf. In this case, the host control program inserts the unique identifier and/or name corresponding to the partition when sending the IUs. Alternatively, the logical partition could be allowed to use the host bus adapter to log in with and send IUs to FICON control units directly using its assigned unique identifier and unique name.

FIG. 8 is a flow diagram for a system with second-level virtual machine guests in accordance with an illustrative embodiment. The steps of the following operation are performed in a host control program, such as host control program 512 of FIG. 5. As the operation begins, the host control program recognizes that the virtual machine control program has activated the virtual machine guest, which is a logical entity (step 802). The virtual machine control program may be a virtual machine control program, such as virtual machine control program 522, 524, 526, 528, or 530 of FIG. 5. A determination is then made as to whether the virtual machine client needs a dedicated unique identifier, such as a N_Port ID (step 804). For example, if a virtual machine guest needs to use all channel image IDs, then the virtual machine guest needs a dedicated unique identifier. If the virtual machine guest does need a dedicated unique identifier, the virtual machine control program requests a unique identifier from the host control program (step 806). The host control program then assigns the unique name corresponding to the requesting virtual machine guest (step 808). This step can be done using a storage area network (SAN) management function, manually, or otherwise. The host control program uses the FICON adapter to request a unique identifier from the fabric using the unique name (step 810).

The host control program receives a unique identifier for the logical partition from the fabric (step 812). The host control program notifies the virtual machine control program that the host control program has the requested unique identifier (step 814). The virtual machine control program then notifies the virtual machine guest that it has a unique identifier (step 816). The host control program then recognizes the virtual machine guest logging in with FICON control units using its assigned unique identifier and unique name (step 818). All channel image IDs can be used. Note that the virtual machine guest or virtual machine control program does not need to know about specific unique names or unique identifiers if the host control program sends IUs on their behalf. In this case, the host control program inserts the unique identifier and/or name corresponding to the partition when sending the IUs. Alternatively, the virtual machine guest and virtual machine control program may be allowed to use the host bus adapter to log in with and send IUs to FICON CUs directly using the assigned unique identifier and unique name.

Finally, the virtual machine guest performs normal I/O operations using its assigned or shared unique identifier and unique name (step 820), with the operation terminating thereafter. If at step 804, the virtual machine guest does not need its own unique identifier, the virtual machine control program and/or the host control program assigns the virtual machine guest one or more FICON channel image IDs, as needed (step 822), with the operation continuing to step 820. FICON channel image IDs may be assigned by the host control program, virtual machine control program, or a combination of both.

Thus, the illustrative embodiments provide a number of advantages for each of the above methods of identification. For example, using N_Port ID virtualization to obtain different N_Port IDs for individual guests, and using a single FICON channel image for all the virtual machine guests, allows zoning to be done at guest level, whereas using different FICON channel image IDs for each virtual machine guest, and sharing a single N_Port ID for all the virtual machine guests, would not allow zoning to be done at the guest level. The described embodiments are valid and could be used simultaneously, especially in cases in which there are a limited number of N_Port IDs available. For example, the virtual machine control program could assign unique N_Port IDs to those virtual machine guests that require zoning control, such as test or development guests, where strict enforcement of separation from the production environments is required, and could assign unique channel image IDs to those guests used for production applications where such strict separation from each other was not required. Such tradeoffs are impossible without the use of N_Port ID virtualization, since only a single N_Port ID is available for all partitions sharing the host bus adapter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using N Port ID virtualization (NPIV) to extend virtualization capabilities of protocols, the computer-implemented method comprising:
   recognizing by a host control program that a virtual machine control program has activated a virtual machine guest in a set of virtual machine guests, wherein the virtual machine guest is a logical entity;
   determining if the virtual machine guest requires a dedicated unique identifier in order to extend a virtualization capability of a protocol to the virtual machine guest using a single FC-SB-3 host adapter to request the unique identifier, wherein the unique identifier is a N_Port ID;
   responsive to the virtual machine guest not requiring the unique identifier, assigning the virtual machine guest one or more FC-SB-3 channel image identifiers as needed;
   responsive to the virtual machine guest requiring a unique identifier, requesting the unique identifier for the virtual machine guest, wherein the virtual machine control program associated with the virtual machine guest requests the unique identifier from the host control program;
   assigning a unique name corresponding to the virtual machine guest using a storage area network management function, wherein the unique name is a worldwide port name (WWPN), wherein the host control program assigns the unique name;
   requesting by the host control program using the single FC-SB-3 host adapter the unique identifier from a fabric using the unique name;
   receiving the unique identifier for a logical partition among a set of logical partitions, from the fabric, wherein the set of logical partitions is able to obtain different unique identifiers for each virtual machine guest in the set of virtual machine guests;
   notifying the virtual machine guest using the virtual machine control program that the virtual machine control program has the unique identifier;
   receiving a log in from the virtual machine guest wherein the virtual machine guest logs in using the unique identifier and the unique name and uses FC-SB-3 control units; and
   recognizing the virtual machine guest.

* * * * *